(12) United States Patent
Dietrich (10) Patent No.: US 7,845,271 B2
(45) Date of Patent: Dec. 7, 2010

(54) FOOD PROCESSING DEVICE

(75) Inventor: Wardo Jacob Hendrik Dietrich, Deventer (NL)

(73) Assignee: Machinefabriek Geurtsen Deventer B.V., Deventer (NL)

( * ) Notice: Subject to any disclaimer, the term of this patent is extended or adjusted under 35 U.S.C. 154(b) by 1169 days.

(21) Appl. No.: 11/474,438

(22) Filed: Jun. 26, 2006

(65) Prior Publication Data

US 2007/0295222 A1   Dec. 27, 2007

(51) Int. Cl.
*A47J 37/12* (2006.01)

(52) U.S. Cl. ........................................... 99/353

(58) Field of Classification Search ................ 425/103, 425/106, 312, 133.1; 99/536, 516; 83/53, 83/177, 844

See application file for complete search history.

(56) References Cited

U.S. PATENT DOCUMENTS

| | | | |
|---|---|---|---|
| 3,797,069 | A | 3/1974 | Von Lersner et al. |
| 4,966,542 | A | 10/1990 | Kobayashi |
| 5,906,297 | A | 5/1999 | Cole et al. |

FOREIGN PATENT DOCUMENTS

| | | | |
|---|---|---|---|
| DE | 3617413 C2 | | 11/1987 |
| EP | 0 130 748 A2 | * | 1/1985 |
| EP | 0130748 | | 1/1985 |
| EP | 0 194 863 A2 | * | 9/1986 |
| EP | 0194863 | | 9/1986 |
| EP | 0791293 | | 8/1997 |
| EP | 0845212 | | 6/1998 |
| GB | 361201 | | 11/1931 |
| GB | 361201 A | * | 11/1931 |
| GB | 1218256 | | 1/1971 |
| JP | 2001008608 | | 1/2001 |
| WO | WO96/39847 | | 12/1996 |
| WO | WO98/22206 | | 5/1998 |
| WO | WO03/053154 | | 7/2003 |

OTHER PUBLICATIONS

VVM Brochure. VERBUFA 2004.

* cited by examiner

*Primary Examiner*—Tu B Hoang
*Assistant Examiner*—Thien Tran
(74) *Attorney, Agent, or Firm*—David P. Owen; Coraline J. Haitjema; Howrey LLP (57) ABSTRACT

A food processing device comprises a paste reservoir, a feed pump and a flow divider. The flow divider is provided with outlets to four supply lines all of which receive a substantially equal supply of paste as a result of the operation of the flow divider. Each of the outlets is connected to a nozzle. A pair of knives is located ahead of the nozzles, each being provided with four apertures. The knives are provided with an actuating mechanism and a controller. Controller registers and controls operation of the meatball forming device and is electrically connected to the feed pump, to a servomotor and to a shaft encoder.

22 Claims, 9 Drawing Sheets

FOOD PROCESSING DEVICE

BACKGROUND OF THE INVENTION

1. Field of the Invention

The present invention relates to a device for food processing, in particular for the processing of pasty foods for the purpose of forming shaped items such as balls, sausages or the like. The invention also covers methods of forming individually shaped items of such pasty food.

2. Description of the Related Art

It is known in the prior art to produce meatballs from a continuous supply of meat paste. The meat paste may be supplied by a conventional dosing pump, which feeds the product to one or more dispensing heads. At the head, a valve or knife periodically cuts the flow of paste into individual lengths, which may then drop into hot water for cooking or may be subjected to any other further treatment as required. A device of this type is known which uses an iris type diaphragm valve to cut the paste. The construction of the valve is complex requiring a large number of moving parts. For use in the food industry such a construction is particularly inconvenient since the cleaning of the valve is complicated especially for non-technical personnel. The valve is also bulky, making the use of multiple outlet/valve combinations virtually impossible.

Other devices are known having a plate with an outlet through which the paste can be forced. A second plate having an aperture complementary to the outlet moves across the first plate to periodically open and close the outlet and cut the supply of paste. These devices effectively cut the paste into individual lengths but are not designed to form it into a desired shape. Such devices also suffer from a number of drawbacks; in particular, the cutting action of the plates is not optimised and causes skewing of the meatball prior to it dropping. Such devices are also not adapted for use with a number of outlets, since variation in delivery pressure between the outlets may lead to considerable product variation.

Food industry standards are increasingly high and food producers require processing machines that deliver well-formed products of consistent dimensions. There is also a need for an improved arrangement that is easy and hygienic to operate and can be assembled quickly and correctly even by unskilled personnel.

BRIEF SUMMARY OF THE INVENTION

The present invention addresses these problems by providing a device for forming individual items from a supply of paste, comprising a paste supply nozzle, a pair of knives, a mechanism for periodically moving the knives across the nozzle to cut the paste supply and to form an individual item and a controller for controlling the shape of the formed items by controlling the supply of paste relative to the movement of the knives. In this way careful forming of the individual items is achieved by matching the motion of the knives to the delivery of the paste. To achieve this, the controller may control the movement e.g. the speed, of the knives to produce the formed items while maintaining a constant paste delivery. Alternatively or additionally the controller may control the paste supply device which supplies the nozzle or nozzles or may otherwise control the rate of paste delivery by varying the speed of a paste supply or by buffering and releasing paste. In all cases, it has been found important to avoid pressure build up during the period of knife closure, which can lead to spurting of the paste once the aperture reopens.

According to a further advantage of the invention it has been found that by use of a pair of knives rather than a single knife, the item may be formed with a desired longitudinal profile. Furthermore, the use of a pair of knives allows the knives to completely overlap ensuring complete severance of the paste. Known iris configurations cannot overlap at the central point and can lead to incomplete severance of the paste, especially in the case that it has a stringy consistency.

According to a preferred embodiment of the invention each knife comprises a generally flat plate aligned generally perpendicular to an axis of the nozzle and provided with an aperture for alignment with the nozzle. The knives may be mounted for transverse reciprocal movement with respect to one another from an open position in which the apertures are generally coaxial with the nozzle, to a closed position in which the apertures are out of alignment and each partially closes the nozzle. The knives may each move from a closed position to an open position and then return to the original closed position. The knives may also be double-acting and move from a closed position to an open position and then continue to a new closed position. Alternatively, the motion may be from an open position through a closed position and on to a second open position.

Particularly for use with paste that may contain inclusions such as fibres, gristle or bones, the knives may be provided with a cutting edge located on a first side of the aperture. The cutting edge may for instance be asymmetric with respect to the remainder of the aperture whereby on reciprocal movement of the knives, the cutting action of the knives is enhanced. In this way, a slicing motion may be achieved, especially in the last part of the cutting stroke. Preferably, the cutting edge or edges may be sharpened or serrated according to the required performance. For double-acting knives, two cutting edges may be provided.

According to a particular advantage of the present invention, the device may comprise a plurality of nozzles. By providing each knife with a plurality of apertures corresponding to the plurality of nozzles, a number of items may be formed at each actuation of the knives. The use of individual nozzles allows the paste supply to each nozzle to be controlled, ensuring homogeneity between all the formed items. Control of the paste supply may be achieved using known flow divider devices that ensure equal division of a paste supply between a number of outlets. In the present context by "flow divider" is meant an device that actively ensures a correct division between the different flow paths as opposed to a manifold that is susceptible to variation. The flow divider may be driven or non-driven. In the case of a plurality of nozzles, all nozzles may open and close together. It may however be preferable to arrange the nozzles and knives in pairs whereby one nozzle in a pair opens as the other one closes. Such an arrangement can be advantageous in combination with a uniform paste flow rate to the nozzle pair.

For a multiple outlet device, the axes of the nozzles are preferably generally parallel to one another and aligned with a direction of movement of the knives. Other configurations may also be used while still adhering to the principle of overlapping knives according to the invention. Thus, the nozzles may be aligned in a first direction e.g. from left to right, while the movement of the knives may be perpendicular to this direction e.g. up and down. In an alternative more compact embodiment, the nozzles may be arranged in a circular configuration and the knives may be embodied as a pair of disks each having apertures aligned with the nozzles. The disks may reciprocate as in earlier embodiments but may also continuously counter-rotate.

It has also been found advantageous to provide a resilient mounting for the knives. According to this feature of the invention, the knives may be mounted to move away from the nozzle should excess pressure build up in the paste supply nozzle, whereby paste can escape laterally from between the nozzle and the knives. The mounting may be provided by a spring arrangement which biases the knives against the nozzle with a given tension, that may be adjustable.

Advantageously, the device according to the present invention comprises easily interchangeable components ensuring simplicity and versatility of operation. In particular, both the knives and the nozzle or nozzles may be interchangeable. These components may thus be easily replaced in case of damage or wear or may be exchanged in case of different production parameters. Such exchange of components is particularly effective in combination with a controller, programmable to provide different control parameters according to the type of nozzle or knife being used.

According to another aspect of the present invention, there is also provided a knife for use in the above-mentioned device. According to the invention, the knife comprises an aperture for alignment with a paste supply nozzle and a connecting element for engaging with an actuating mechanism, whereby the knife may be actuated to reciprocate across the outlet of a nozzle. The knives may be provided individually or in pairs and in order to ensure correct alignment with the nozzle, actuating mechanism or with each other, may be provided with an indexing notch.

According to the present invention there is also provided a method of forming shaped individual items from a supply of pasty product comprising extruding the pasty product through a nozzle, providing a pair of knives located on either side of the nozzle, and periodically moving the knives across the nozzle to cut the supply and form the individual items. Preferably, the knives are arranged to slide over one another and may be provided with profiled apertures for forming specific shapes.

According to a further aspect of the method according to the invention the speed of movement of the knives may be controlled to determine a longitudinal profile of the formed individual items. Additionally or alternatively the speed of extrusion of the paste may be controlled to determine the longitudinal profile of the formed individual items. This may be achieved by controlling the speed of a feed pump or by buffering a quantity of paste upstream of the nozzle.

It is customary to extrude individual items onto a conveying surface or e.g. into a bath of cooking oil. In accordance with a further inventive feature, in order to allow for the variation in the rate of extrusion of the paste, the speed of movement of the conveyor or oil bath may also be adapted to the speed of extrusion.

BRIEF DESCRIPTION OF THE DRAWINGS

Other features and advantages of the present invention will become evident in the light of the accompanying description and figures in which a number of embodiments of the present invention are described, by way of example only, wherein.

DESCRIPTION OF ILLUSTRATIVE EMBODIMENTS

Figure 1:
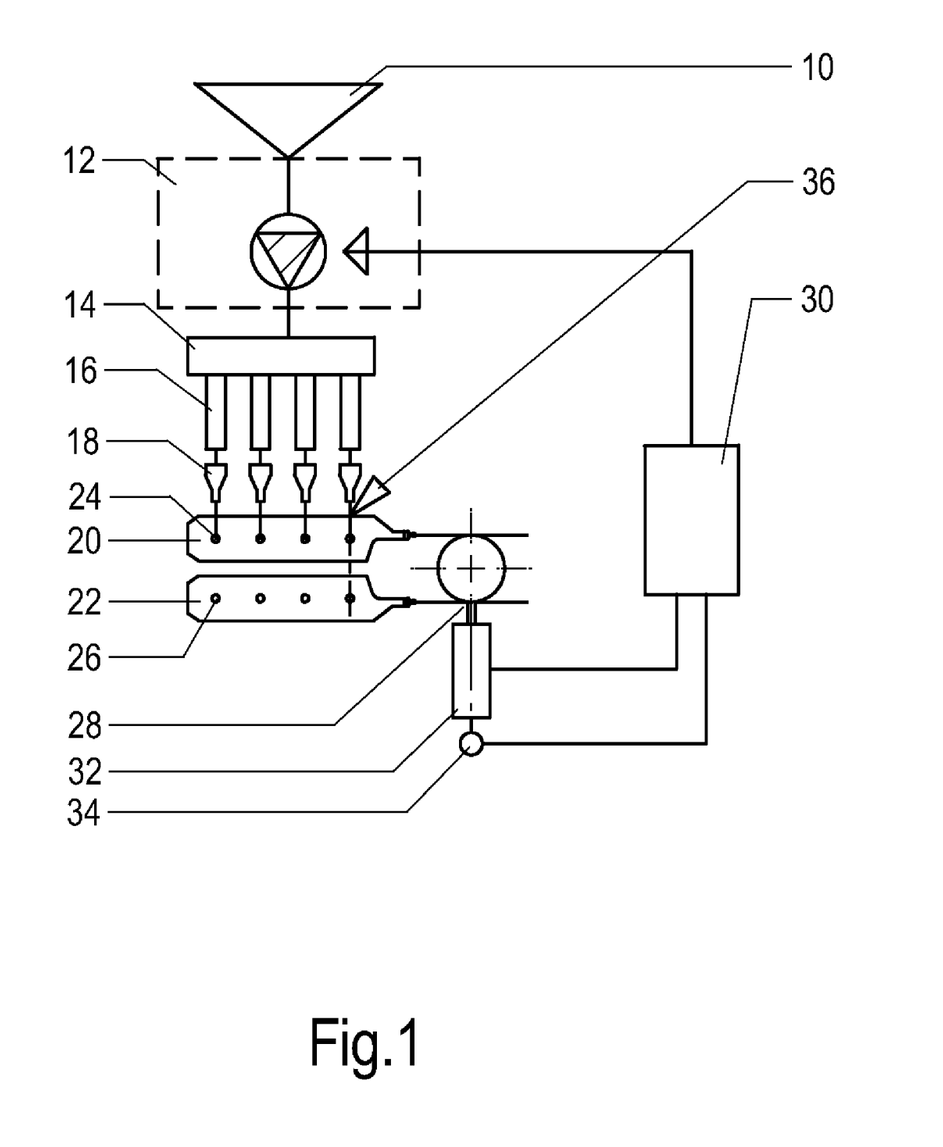
FIG. 1 is a schematic view of a meatball forming device according to the present invention.

FIG. 1 shows a schematic view of the principle components of a meatball forming device 1 according to an aspect of the present invention. The device 1 comprises a paste reservoir 10, a feed pump 12 and a flow divider 14. The feed pump 12 may be any conventional pump suitable for providing a constant stream of meat paste from the reservoir 10 to the flow divider 14. The flow divider 14 is preferably a rotary flow divider such as the non-driven vane type device known from PCT publication No WO98/22206, the contents of which are hereby incorporated by reference in their entirety. Other forms of distribution may also be used to divide the flow of paste from the pump 12 to a plurality of supply lines 16. The flow divider 14 is provided with outlets to four supply lines 16 all of which receive a substantially equal supply of paste as a result of the operation of the flow divider 14. Each of the outlets 16 is connected to a nozzle 18. A pair of knives 20, 22 is located ahead of the nozzles 18, each being provided with four apertures 24, 26. The knives 20, 22 are provided with an actuating mechanism generally designated by reference numeral 28 in FIG. 1. Device 1 is also provided with a controller 30, the operation of which will be further described below. Controller 30 registers and controls operation of the meatball forming device 1 and is electrically connected to the feed pump 12, to a servomotor 32 and to a shaft encoder 34. FIG. 1 also indicates a zeroing position 36.

Figure 2:
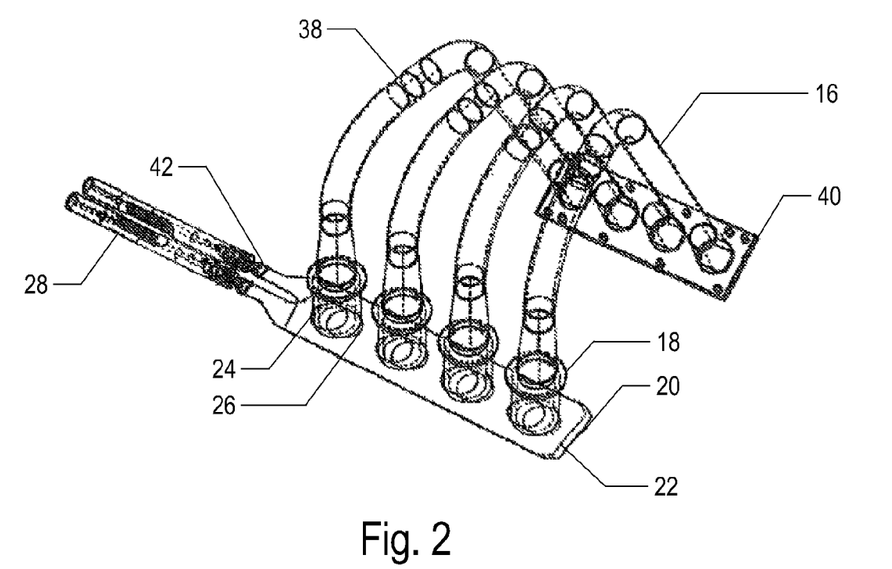
FIG. 2 is a 3-dimensional schematic view of the knives and nozzles of the meatball forming device of FIG. 1.

FIG. 2 shows in a three-dimensional view, further details of the arrangement of knives 20, 22 and the supply lines 16. The supply lines 16 are shown in the form of a manifold 38 leading from an inlet flange 40 for connection to the flow divider 14 to the nozzles 18. As can be seen from FIG. 2, the supply lines 16 may be formed in a complex geometric shape in order to connect the flow divider 14 having a first orientation and configuration with the nozzles 18 which may have a second different orientation and configuration. In the present example, the manifold 38 exits generally upwards from the flange 40 but is oriented generally vertically downwards for connection to the nozzles 18. The downward orientation of the nozzles 18 is preferred for allowing the formed meatballs to drop directly into a cooking recipient. In the illustrated embodiment, the supply lines 16 are in a linear arrangement at both the flange 40 and at the nozzles 18. The spacing between them has however increased. It is however also possible that the spacing may decrease or that the orientation may change from e.g. a linear arrangement at the flange 40 to a more compact circular arrangement at the nozzles 18. The use of a flow divider 14 providing a consistent flow between the different supply lines 16 has been found to be important in the case of complex manifold geometries. In this way, the supply of paste to each of the nozzles 18 can be maintained substantially equal.

FIG. 2, also shows the arrangement of the knives 20, 22 and their connection 42 to the actuating mechanism 28. Knives 20, 22 are arranged one above the other in contact with the nozzles 18. For the sake of clarity, other elements of the nozzle assembly for supporting the nozzles and knives have not been shown in this view. In FIG. 2, the knives 20, 22 and actuating mechanism 28 are in the zeroed position. In this position, the apertures 24 in knife 20 and the apertures 26 in knife 22 are partially aligned.

Figure 3:
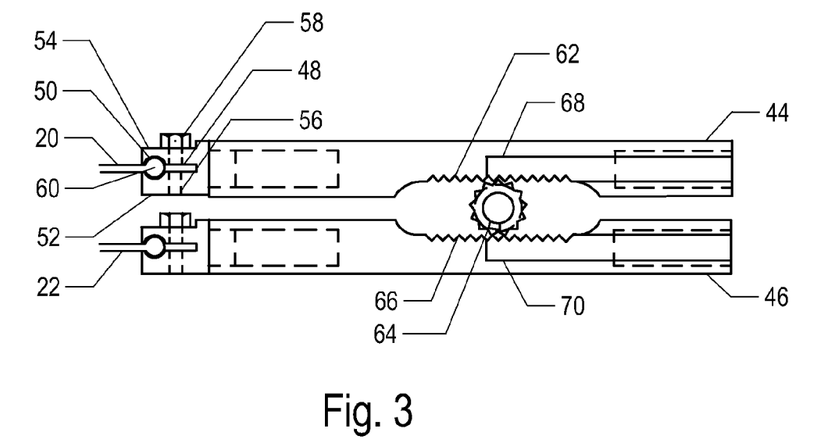
FIG. 3 is a detailed view of the actuating mechanism of FIG. 2.

The connection of the knives 20, 22 to the actuating mechanism 28 will now be described in further detail with reference to FIG. 3. Referring to FIG. 3, the actuating mechanism comprises a pair of knife holders 44, 46. Since the knives 20, 22 and holders 44, 46 are substantially identical, only knife holder 44 will be further described. A first distal end of knife holder 44 is provided with an elongate slot 48 forming a pair of arms 50, 52. The distal extremities of the arms 50, 52 are shaped to form a generally cylindrical connecting socket 54. A partially threaded bore 56 passes through the arms 50, 52 whereby a bolt 58 may be inserted in threaded bore 56 to clamp the arms together. The proximal ends of the knives 20, 22 are also provided with generally cylindrically shaped joints 60, which can be captured and clamped in the socket 54 to ensure a secure connection between the actuating mechanism 28 and the knives 20,22.

Referring again to FIG. 3, on a side of the knife holder 44 facing towards knife holder 46, there is provided a toothed rack 62. A similar toothed rack 64 is provided on the facing surface of knife holder 46. The toothed racks 62, 64 are engaged with a pinion 66 mounted on the axis of the servomotor 32. The knife holders 44, 46 are also provided with a pair of indexing marks 68, 70 which align when the actuating mechanism 28 is in the zero position.

Operation of the knives 20, 22 and actuating mechanism 28 will now be described with reference to FIGS. 4A to 4C. In these Figures, the pinion 66 and nozzles 18 are not shown for the sake of clarity.

Figure 4:
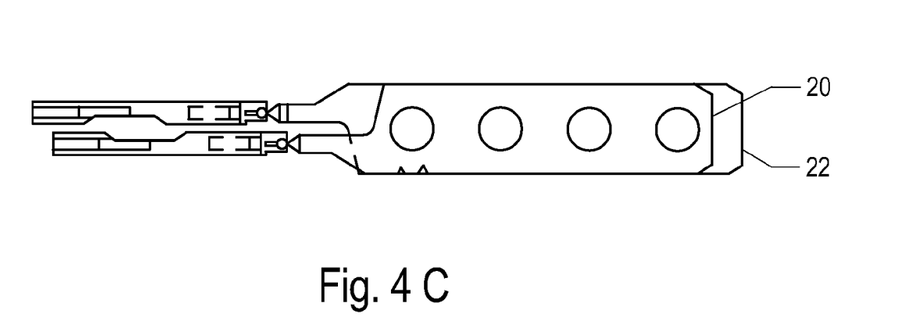
FIGS. 4A, 4B and 4C are views of the knives of FIG. 2 in various positions of operation.

FIG. 4A shows the zero position of the actuating mechanism 28 in which the indexing marks 68, 70 are aligned with each other. In this position, the knives 20, 22 substantially overly one another but the apertures 24, 26 are partially out of alignment. The effective aperture through the knives is provided by the elliptical area of intersection 72. FIG. 4A also shows a pair of notches 74, 76 in the knives 20, 24, which are also aligned in the zero position.

FIG. 4B shows the closed position of the knives. By operation of the servomotor 32, the pinion 66 (not shown in these views) may be rotated through a given angle in a clockwise direction. By interaction of the racks 62, 64 with the pinion 66, the knife 20 is caused to move a distance in a first direction (to the right in FIG. 4B) while the knife 22 is caused to move an equal distance in the opposite direction. The given angle of rotation of the pinion 66 is chosen so that there is no area of intersection of the apertures 24, 26 and the paste supply nozzles 18 are completely closed. A slight overlap of the apertures 24, 26 may be provided to ensure effective cutting of the paste. The amount of overlap may be adjusted according to the conditions of use.

FIG. 4C shows the open position of the knives. By operation of the servomotor 32, the pinion 66 may be rotated in an anticlockwise direction. By interaction of the racks 62, 64 with the pinion 66, the knife 20 is caused to move back through the zero position (to the left in FIG. 4B) while the knife 22 is now caused to move an equal distance in the first direction. Movement continues until the apertures 24, 26 are completely aligned. In this position they are also aligned with the nozzles 18 and full-bore flow of paste can be achieved.

Figure 5:
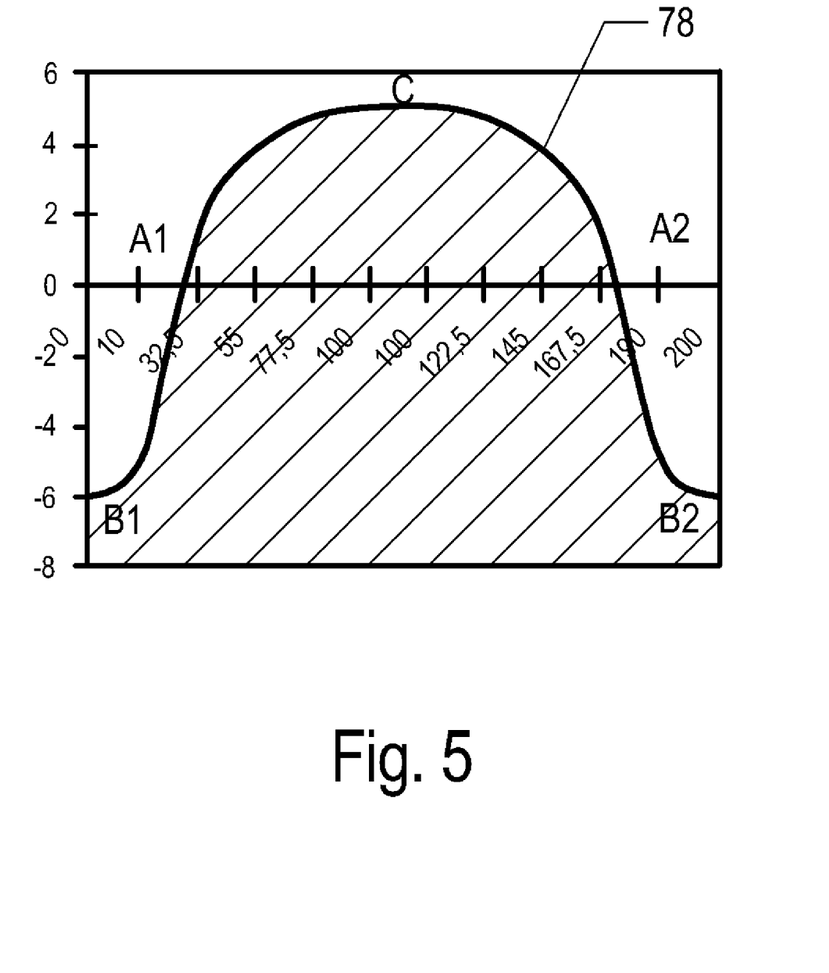
FIG. 5 is a timing diagram of knife position versus product flow.

FIG. 5 shows a timing diagram illustrating how the movement of the knives 20, 22 may be correlated with the action of the feed pump 12 to form a generally spherical meatball. According to the present embodiment, this correlation is achieved by software programming of the controller 30. It is understood however that mechanical arrangements may also be used to achieve a similar effect. FIG. 5 depicts the movement of the knives with respect to the zero position on the vertical axis and the movement of the product on the horizontal axis. In the present case, the units of measurement are not indicated and are irrelevant for the present description, since it is the relative variation of these values which determines the shape of the product.

The curve 78 in FIG. 5 commences at position B1 which corresponds to the closed position of the knives of FIG. 4B. Operation of the servomotor 32 in the anticlockwise direction causes the apertures 24, 26 to move towards each other and intersect. The nozzles 18 open and paste begins to flow. The shape of the curve 78 is determined by the controller 30 and can be programmed according to the required product shape. The controller 30 is provided with feedback of the position of the servomotor 32 from the shaft encoder 34. According to FIG. 5, the knives reach the zero position A1, corresponding to FIG. 4A, at the point at which 30 out of a total of 200 units of paste have been delivered. The steep slope of the curve 78 at point A indicates that the knives are moving quickly at this point as the leading edge of the meatball is formed. Point C corresponds to the fully open position of the knives according to FIG. 4C. At this point the nozzles 18 are fully open and half of the paste required for a single meatball has been delivered.

Once the widest section of the meatball has been formed, the servomotor 32 commences to rotate in a clockwise direction and the effective apertures through the knives begin to close. At the point A2, the knives are again in the zero position. At this point, approximately 170 of the 200 units have been delivered and the knives are closing quickly, thereby shaping the trailing edge of the meatball.

Clockwise rotation of the servomotor 32 and movement of the knives continues until the curve 78 reaches point B2. At point B2, the knives are again in the fully closed position according to FIG. 4B and forming of the meatball is complete. During the initial period of the cycle of operation at B1 and in the final stages of closure B2, the amount of paste delivered is small. If the feed pump 12 were to continue to operate at constant speed, there would be danger of pressure build up in the nozzle leading to spurting of the paste. In order to achieve optimal opening and closing contours of the meatball, the speed of operation of the feed pump 12 is reduced at these points and adapted to the degree of opening of the knives.

Since both the operation of the knives and that of the feed pump can be controlled by the controller 30, a wide range of longitudinal profiles can be produced. Thus by keeping the nozzles fully open for a longer period, sausage shaped items of paste may be formed. Similarly, by stopping the feed pump during closure of the knives, abrupt leading or trailing edges may be formed. While in many cases it will be desirable to completely sever each item from the paste supply, in certain cases it may be desirable not to completely close the knife apertures. In this manner a weak connecting web may be maintained between adjacent items, which may be advantageous during further processing of the paste.

The procedure for zeroing the knives will now also be explained with reference to FIG. 1 and FIG. 4A. According to an important aspect of the present invention, in order to achieve consistent and accurate operation of the meatball forming device 1, it is important that the positions of the knives 20, 22 can be reliably zeroed and that this can easily be verified. Controller 30 is provided with software programs including a number of subroutines for performing specific functions, a number of which will be outlined below. In particular, the controller 30 and its software recognise a zero position for the purpose of calculating the relative positions of the knives 20, 22. In the present embodiment, this zero position corresponds to the half open position of FIG. 4A in which the knife holders 44, 46 are substantially aligned. This position can also be ascertained by feedback from the shaft encoder 34. In order to initially set the zero position, a factory engineer moves the knife holders until the indexing marks 68, 70 and the notches 74, 76 are respectively aligned. This position is then set in the controller 30 as zero by initiating a "Zero Knives" subroutine in the controller software. Once the zero position is set, it cannot be changed by an unauthorised user. In order to check the correct zeroing of the knives, a user may initiate a "Check Zero" subroutine. This causes the controller 30 to move the servomotor 32 to the position corresponding to the zero position. The user may then visually check that the indexing marks 68, 70 and notches 74, 76 are correctly aligned and request servicing of the device if this is not the case.

In the present embodiment, the "Zero Knives" subroutine is manually performed during factory setup or by a service engineer. In an alternative embodiment the device 1 may be arranged for zeroing automatically or by the user each time e.g. the knives are exchanged. The device 1 may thus be provided with an automatic sensor for locating the zero position of the knives e.g. on the basis of signals from the shaft encoder 34. For arrangements with interchangeable knives having a variation between zero position, it may be necessary for the user to follow the "Zero Knives" subroutine on exchanging the knives.

Figure 6:
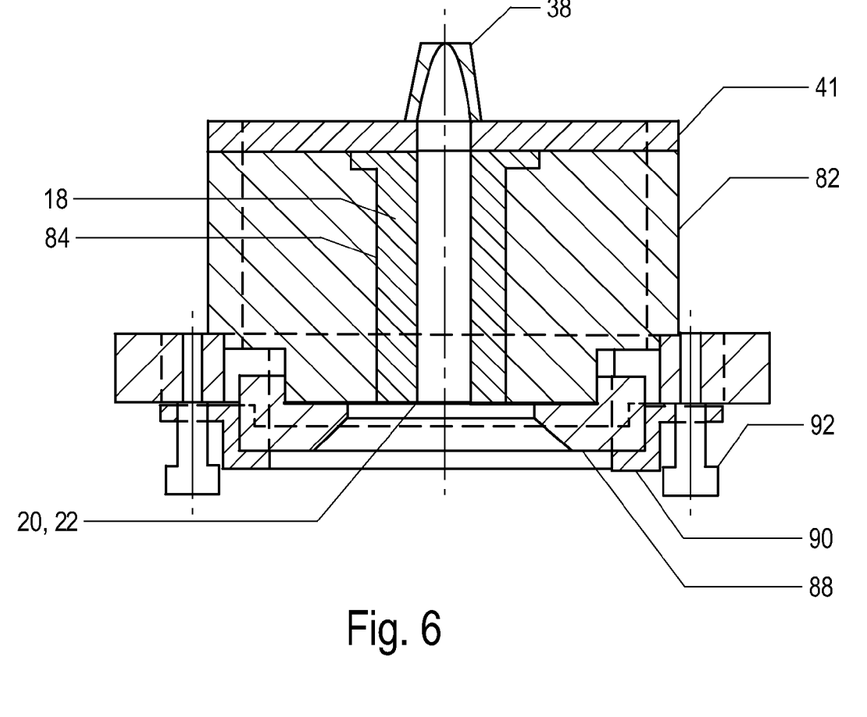
FIG. 6 is a cross sectional view of nozzle block according to an embodiment of the invention.

The controller 30 includes a number of other subroutines that are accessible to either service engineers or users. Thus a "Set Overlap" subroutine may be initiated to adjust the closing overlap (or gap) of the knives. This overlap may be set according to the paste characteristics. It may also be used for improving the turnaround of the actuating mechanism during the closed period FIG. 6 shows in detail a transverse cross section through a practical construction for a nozzle assembly 80 according to an aspect of the present invention. The nozzle assembly 80 comprises a nozzle block 82 formed of a generally solid block of polyethylene terephthalate (PETP). Other food hygiene standard materials may also be used but PETP has been found preferable for use in the food industry both from food hygiene reasons and for its resilience and ease of cleaning. The nozzle block 82 may be attached to an outlet flange 41 of the manifold 38 by screws, clamps or other similar devices. It is formed with a number of bores or openings 84, sized to receive the nozzles 18 in a sliding fit. In this way, nozzles may be easily interchanged. The openings 84 are also provided with a keyway (not shown) to ensure the correct angular orientation of the nozzle 18. This is of course important for use with non-circular nozzles. A knife plate 88 overlies the nozzle block 82 and is resiliently held against it by a number of spring clamps 90 that may be adjustably biased by bolts 92 according to the tension required. The knives 20, 22 are confined to slide between the nozzle block 82 and the knife plate 88. Should excess pressure develop in the nozzles 18, exceeding the pretension of the spring clamps 90, the knife plate 88 will lift away from contact with the nozzle block 82 allowing paste to escape. The meatball forming device 1 according to the invention may also be provided with signalling means to signal such overpressure e.g. by detecting movement of the knife plate 88.

According to FIGS. 7A to 7G there are shown numerous alternative embodiments of the invention in which like reference numerals are used to designate similar elements. In particular, by providing interchangeable nozzles and knives various different shaped products may be formed and different cutting characteristics may be achieved.

Figure 7:
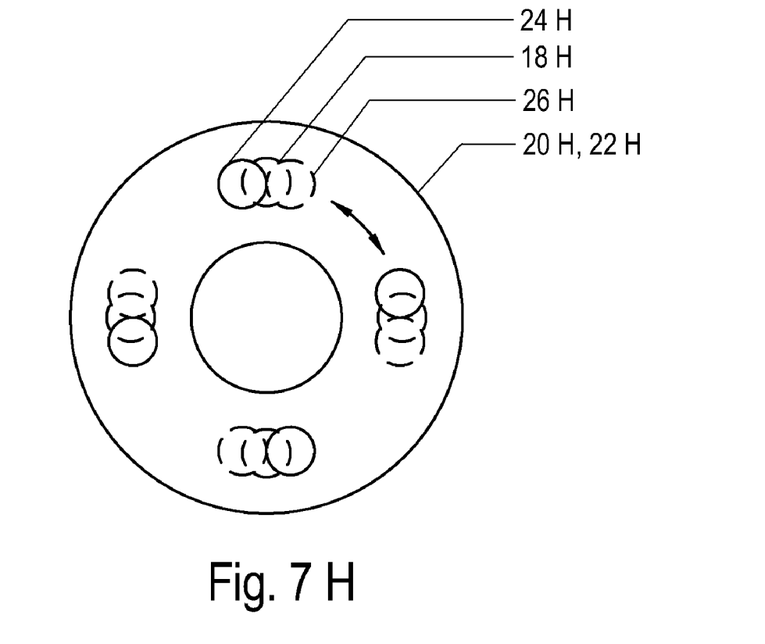
FIGS. 7A to 7H and 7J are schematic views of alternative knife arrangements.
Figure 7A:
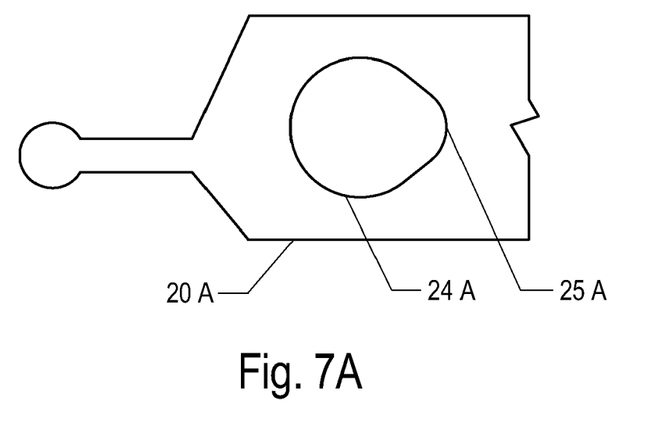

FIG. 7A shows a knife 20A having an aperture 24A with an elliptical cutting surface 25A. The elliptical cutting surface 25A is advantageous over a round surface both in providing enhanced cutting action and also in that it more closely approaches a circular aperture during closing of the knives.

Figure 7B:
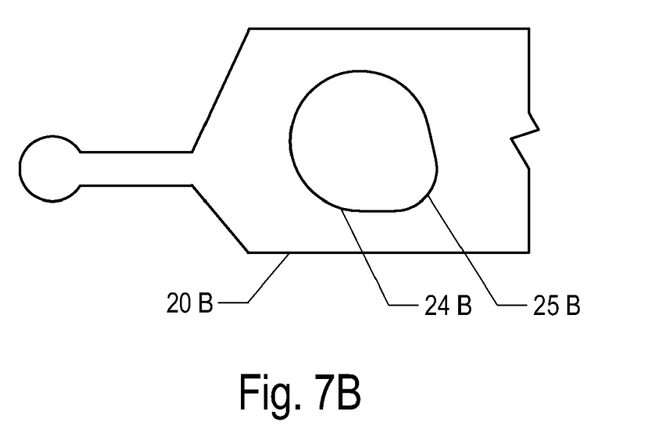

FIG. 7B shows a knife 20B having an aperture 24B with an asymmetric shaped cutting surface 25B, which in certain circumstances provides improved cutting or slicing.

Figure 7C:
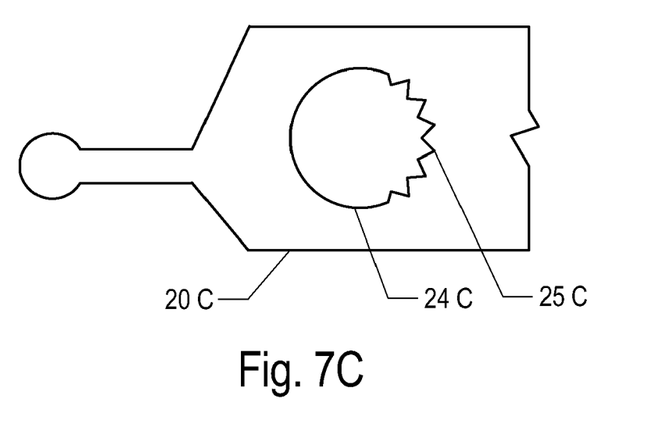

FIG. 7C shows a knife 20C having an aperture 24C with a serrated cutting surface 25C.

Figure 7D:
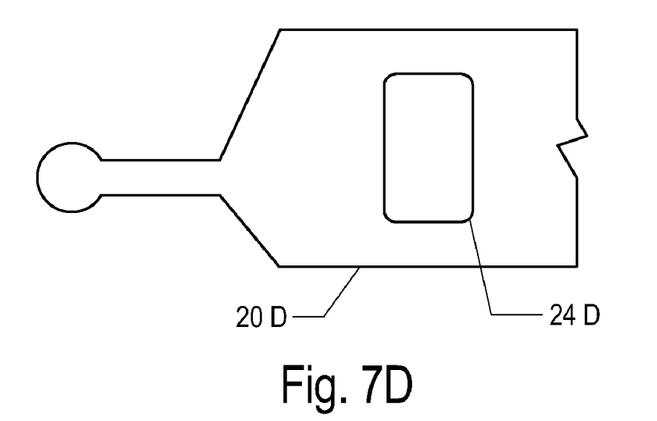

FIG. 7D shows a knife 20D having a generally rectangular shaped aperture 24D for use with a rectangular shaped nozzle (not shown). Such an arrangement may for instance be used to produce short sausage shaped items having a length corresponding to the length of the aperture 24D and a diameter corresponding to its width.

Figure 7E:
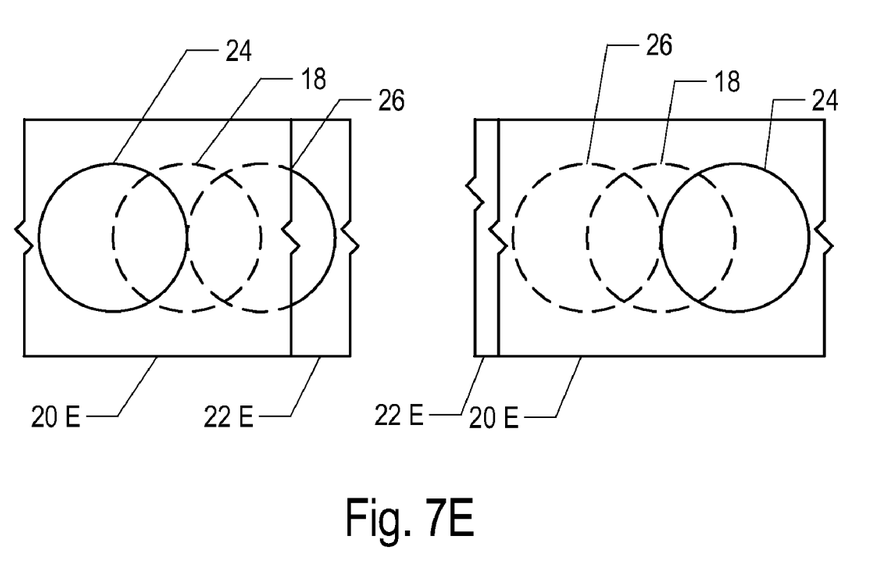

FIG. 7E illustrates a pair of knives 20E, 22E operable in a double action motion between closed end positions. In each cycle, the knives 20E, 22E move from a first closed position through the fully open position to a second closed position before returning through the open position to the first closed position. In this embodiment the zero position may be provided at the fully open position.

Figure 7F:
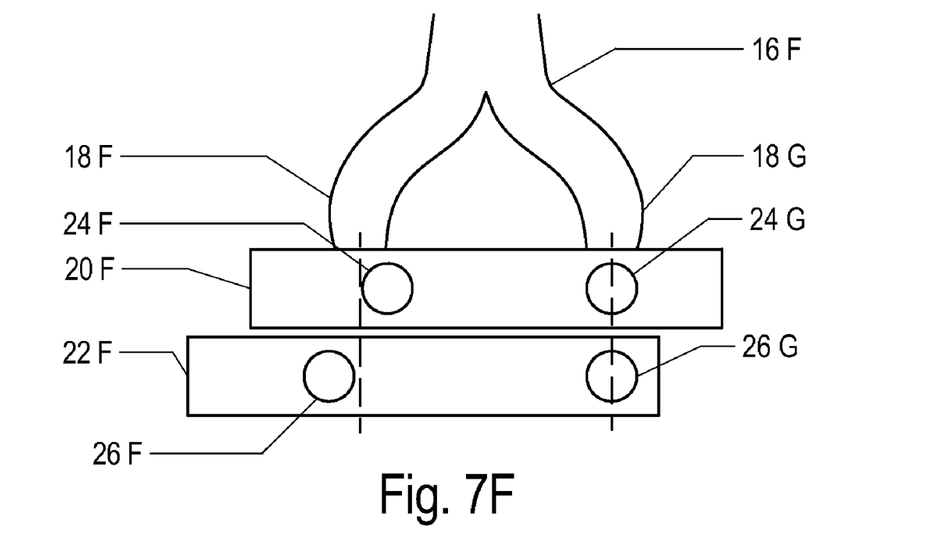
Figure 7G:
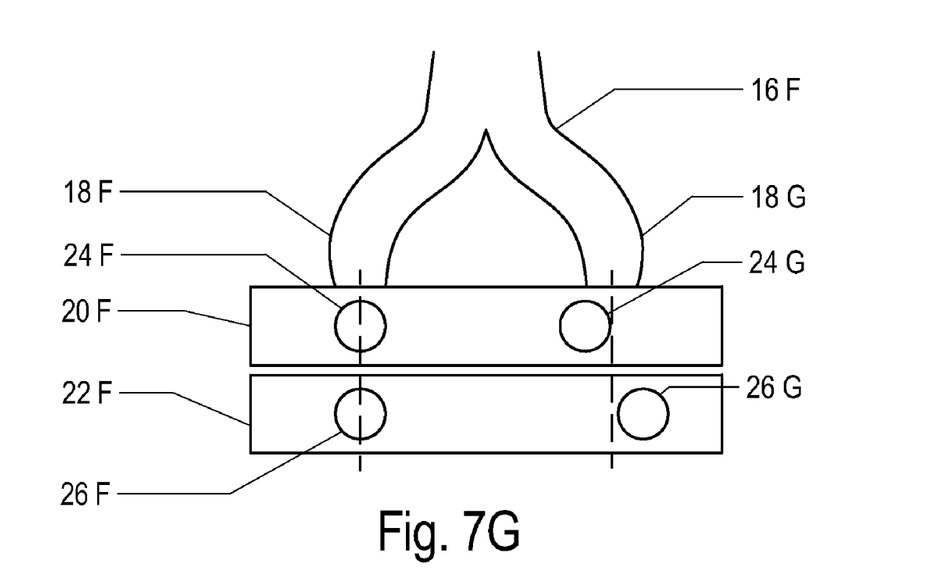

FIGS. 7F and 7G illustrate schematically a pair of knives 20F, 22F operable in combination with a nozzle pair 18F, 18G. As can be seen, both nozzles 18F and 18G are supplied from a single outlet 16F. Knife 20F has a pair of apertures 24F, 24G and knife 22F has a pair of apertures 26F, 26G. It may be noted that the spacing of apertures 24F and 24G is smaller than the spacing of apertures 26F and 26G. In the position shown in FIG. 7F, the apertures 24G and 26G are aligned with nozzle 18G. In the position shown in FIG. 7G, the apertures 24F and 26F are aligned with nozzle 18F and nozzle 18G is closed. In this mode of operation, either one or other of the nozzles 18F, 18G is always open and paste flow through outlet 16F can be continuous.

FIG. 7H illustrates the principle of the invention in a compact square or circular configuration. In this embodiment, the knives 20H, 22H are formed in an annular shape and the nozzles 18H are aligned around the circumference at the four corners of a square. Counter rotating reciprocation of the knives 20H, 22H under the same speed control as described above ensures careful forming of the items. It is noted in this context, that if the formed items are dropped into a moving cooking liquid or other form of conveyor, care must be taken to ensure that the items from one cycle do not drop onto those of a previous cycle.

According to a further feature of the present invention, the controller 30 may also control operation of other accessories in the production process such as the subsequent movement of formed items. By matching this movement to the dropping of the formed items, it can be ensured that all four items of a previous cycle have passed by before the items from the subsequent cycle drop. Alternatively, the subsequent items may be arranged to interleave by dropping after only a first two of the previous items have passed.

FIG. 7J shows a further alternative embodiment in which the knives 20J, 22J are arranged for linear reciprocal movement in a direction perpendicular to the alignment of the apertures 24J, 26J. In this embodiment too, it is shown how actuation of the knives may also take place from opposite sides. This embodiment also illustrates that for single action operation, the aperture need not be a completely closed aperture since only a single cutting surface 25J, 27J is operational.

Many modifications in addition to those described above may be made to the structures and techniques described herein without departing from the spirit and scope of the invention. Accordingly, although specific embodiments have been described, these are examples only and are not limiting upon the scope of the invention.

What is claimed is:

1. A device for forming individual items from a supply of paste, the device comprising:
   a paste supply nozzle;
   a paste supply device for supplying paste to the paste supply nozzle;
   a pair of knives which co-operate with each other to form an extrusion opening through which paste supplied to the nozzle is extruded;
   a mechanism for periodically moving the knives across the nozzle to cut the paste supply and to form an individual item; and
   a controller for selectively controlling the longitudinal shape of the formed items, the controller being adapted to control the rate of supply of paste relative to the rate of movement of the knives to extrude the paste through the extrusion opening while varying the size of the extrusion opening.

2. The device according to claim 1, wherein each knife comprises a generally flat plate aligned generally perpendicular to an axis of the nozzle and provided with an aperture for alignment with the nozzle.

3. The device according to claim 2, wherein the knives are mounted for transverse reciprocal movement with respect to one another between an open position in which the apertures are generally coaxial with the nozzle, and a closed position in which the apertures are out of alignment and each knife partially closes the nozzle.

4. The device according to claim 3, comprising a plurality of nozzles and wherein each knife has a plurality of apertures corresponding to the plurality of nozzles.

5. The device according to claim 4, wherein the nozzles are generally parallel to one another and aligned with a direction of movement of the knives.

6. The device according to claim 5, further comprising a flow divider located between the paste supply device and the nozzles for equally dividing the paste flow between the nozzles.

7. The device according to claim 6, wherein the flow divider is a rotary flow divider.

8. The device according to claim 1, wherein the mechanism for periodically moving the knives across the nozzle comprises a rack and pinion arrangement.

9. The device according to claim 1, wherein the controller is operable to place the mechanism in a zero position and the mechanism or the knives are provided with an indexing mark corresponding to the zero position.

10. The device according to claim 1, wherein each knife comprises a cutting edge located on a first side of the aperture.

11. The device according to claim 10 wherein the cutting edge is asymmetric with respect to the remainder of the aperture whereby on reciprocal movement of the knives, the cutting action of the knives is enhanced.

12. A method of forming shaped individual items from a supply of pasty product comprising:
   providing a nozzle;
   providing a pair of knives located adjacent to the nozzle to form an extrusion opening;
   extruding the paste through the extrusion opening;
   periodically moving the knives across the nozzle to cut the supply and form the individual items; and
   selectively controlling the speed of extrusion of the paste with respect to the movement of the knives to extrude the paste through the extrusion opening while varying the size of the extrusion opening to determine a longitudinal profile of the formed individual items.

13. The method of claim 12 for use with a plurality of nozzles, further comprising actively dividing the supply of paste equally between the plurality of nozzles.

14. The method according to claim 12, wherein the speed of extrusion is controlled by buffering a quantity of paste during a period that the knives are moved across the nozzle to cut the supply.

15. The method according to claim 12, wherein the speed of extrusion is controlled by buffering a quantity of paste prior to extrusion through the nozzle.

16. A knife for use in the device according to claim 1, the knife comprising an aperture for alignment with a paste supply nozzle and a connecting element for receiving an actuating mechanism.

17. The knife according to claim 16, further comprising an indexing mark for indexing the knife for alignment with another similar knife or with the paste supply nozzle.

18. A device for forming one or more shaped items from a supply of paste, the device comprising:
   two movable knives which co-operate to form an extrusion opening;
   a paste supply system for supplying paste to the extrusion opening;
   a mechanism for moving the knives to vary the size of the extrusion opening; and
   a controller for controlling the paste supply system and the mechanism, the controller being adapted to control the supply of paste and movement of the knives to extrude paste through the extrusion opening formed by the knives while varying the size of the extrusion opening to determine the longitudinal shape of the formed items.

19. The device according to claim 18, wherein each knife comprises a generally flat plate aligned generally perpendicular to an axis of the nozzle and provided with an aperture for alignment with the nozzle.

20. The device according to claim 19, wherein the knives are mounted for transverse reciprocal movement with respect to one another between an open position in which the apertures are generally coaxial with the nozzle, and a closed position in which the apertures are out of alignment and each knife partially closes the nozzle.

21. The device according to claim 18, wherein the controller is operable to place the mechanism in a zero position and the mechanism or the knives are provided with an indexing mark corresponding to the zero position.

22. The device according to claim 18, wherein each knife comprises a cutting edge located on a first side of the aperture, and wherein the cutting edge is asymmetric with respect to the remainder of the aperture whereby on reciprocal movement of the knives, the cutting action of the knives is enhanced.

* * * * *